2,962,424
METHOD OF PRODUCING LACTOBACILLUS BIFIDUS

Martin Kludas, Berlin-Charlottenburg, Germany, assignor to Med Fabrik Chemische-Pharmazeutischer Praparate J. Carl Pfluger, Berlin-Halensee, Germany No Drawing. Filed Oct. 17, 1958, Ser. No. 767,795

Claims priority, application Germany Oct. 24, 1957

8 Claims. (Cl. 195—96)

The present invention relates to a new method of culturing, and more particularly to a method of culturing Lactobacillus bifidus.

Recent scientific literature relating to the intestinal flora of human beings in addition to the importance of Escherichia coli and Lactobacillus acidophilus also points out and recommends the extremely important physiological functions of Lactobacillus bifidus, as well as use to be made of these micro organisms for therapy in particular intestinal and other diseases.

According to Mayer (Intern.Zschr.Vitaminforschg. XXVIII: 101 (1957)) the acid production of Lactobacillus bifidus (lactic acid, acetic acid, propionic acid, formic acid and butyric acid) is among the most important protective measures of the intestines against infection with pathogenic organisms. Mayer has shown that Lactobacillus bifidus suppresses the growth of and thereby displaces Dyspepesiecoli, Pneumococcus, Proteus and Bacillus mesentericus. Adam on infant enteritis (Georg Thieme Verlag, Stuttgart 1956) has demonstrated on mice that the introduction of bifidus cultures effects an anti-parasitic action.

Marten (Vitamine und Hormone 6: 172 und 334 (1954)) has reported that Lactobacillus bifidus is valuable not only for the rearing of infants and for the treatment of serious diseases in children, such as colitis ulcerosa and coeliacy, but also for severe chronic inflammations and diseases of the intestines of adults. Marten concluded that the re-seeding of the intestines of adults as well as of children with Lactobacillus bifidus has great advantages.

According to Boventer (Er.Hyg. 26: 193 (1949)) Lactobacillus bifidus maintains a natural self-purification action of the intestine similarly to the action in our seas and rivers.

Mayer (Erg.Inn.Med. Kinderhk. 1956: 429) considers that the variety of valuable properties of Lactobacillus bifidus for adults as well as for infants is of considerable importance for modern dietetics and that these properties should be made available. It must be assumed that the more than fifty years of research in this field has not only contributed to prophylaxis but also to the therapy of various intestinal diseases.

According to Stepp (63. Tagg. Dtsch. Gesellschaft Inn. Med. Weisbaden 1957) a bifidus flora can have the greatest value in therapy since Lactobacillus bifidus never becomes pathogenic and Staphylococcus cannot grow in its presence. Catel (63. Tagg. Dtsch. Gesellschaft Inn. Med. Wiesbaden 1957) has reported that Lactobacillus bifidus is of vital importance not only for the supply of vitamins $B_1$ and $B_2$ and K, but also because Lactobacillus bifidus forms nutritive acids in considerable amounts (volatile fatty acids and to a great extent lactic acid) and the thus produced acidity in the large intestine results in an important protection against the development of a pathological flora. According to Catel it is possible by the artificial production of a bifidus flora to reduce putrefaction processes and to cure diseases.

Thurau (63. Tagg. Dtsch. Gesellschaft Inn. Med. Wiesbaden 1957) has been able to demonstrate that Lactobacillus bifidus requires less amino acids than other intestinal bacteria and as a result more amino acids remain available for the individual. The reason why a bifidus flora, which is only found in breast fed children and not in artificially fed infants, is desirable is shown by investigations carried out by Robinson (Lancet 1951:788). It was observed in 3,262 infants that the mortality rate of breast fed children in England was 1.02%, while with bottle fed children (who were not given Lactobacillus bifidus) the mortality rate was 5.73%. On the other hand the morbidity rate of breast fed children was 22.34% while that of bottle fed children was 57.37%.

Ross and Dawes (Lancet 1954: 994) have called attention to the lower rate of intestinal disturbances of children with Lactobacillus bifidus, and trace this to the lower pH in the large intestines mainly resulting from the formation of formic acid by Lactobacillus bifidus. At the same time Ross and Dawes observed that the addition of milk sugar to bottle foodstuff alone has no effect in lowering the pH of the stool and accordingly does not result in any protection of such children against intestinal disturbances.

Since, however, the simple giving of bifidogenic substances does not give rise to any classical bifidus flora (Gross: Neue Osterr.Zschr.Kinderhk. I: 556 (1957); Petuely and Lindner: Zbl. Bakt. I Orig. 169: 178 (1957); Davini: Policlinico infantile 14:285 (1946); Frisell: Acta Paediatrica (Stockh.) 40, 80 (1941); Kirchsieper and Mehl: Kinderarztl. Praxis 23: 49 (1955)) it has been attempted to implant living Lactobacillus bifidus into the intestine or to feed the Lactobacillus bifidus into the intestine, whereby a seeding of the intestine with Lactobacillus bifidus results (Mayer: Zschr.Kinderhk. 65: 293 and 319 (1949)).

In addition to the above mentioned physiological functions, Lactobacillus bifidus also exhibits a vitamin production: $B_1$: Reichelt: Mschr.Kinderhk. 63: 138 (1935); 77: 327 (1939). $B_2$: Boventer: Erg.Hyg. 26: 193 (1949). K: Orla-Jensen, Dan and Glavind: Zbl.Bakt.II Orig. 104:202 (1939).

In order to do justice to the clinical recommendations and requirements for therapeutic dispensing of live Lactobacillus bifidus bacteria, it is necessary to be able to produce these bacteria in exceedingly large amount.

However, it is known that the culturing of Lactobacillus bifidus involves extremely great difficulties. The fact is commonly known that Lactobacillus bifidus is strictly anerobic. (Orla-Jensen: Danske Vidensk Selsk.biol.Skr. II, 3 (1943); Malyoth and Bauer: Zschr.Kinderhk. 68: 358 (1950)). According to Kuhn and Tiedemann (Zschr.Naturforschg. 8b: 428 (1953)) Lactobacillus bifidus requires $CO_2$ in the atmosphere, and according to Norris, Flanders, Tomarelli and Gyorgy (J. Bact. 60: 681 (1950)) at least 3% $CO_2$ is necessary.

Furthermore, prior to the present invention, Lactobacillus bifidus could not be cultured in or on simple nutrient mediums, but as shown in the literature only extremely complicated nutrient mediums could be used. Frisell (Studies on bacterium fibidum in healthy infants. Almquist and Wiksells, Uppsala (1951) utilized tomatoe juice, caseine peptone solution, yeast autolysate solution, tryptone (Dyfco) together with agar. Blaurock (Z.Kinderhk.68: 304 (1937)) has indicated that the most important nutrient substrate is liver extract. Braun and Margret (Z.Kinderhk.70: 641 (1952)) utilized digested woman's milk for the culturing of Lactobacillus bifidus. Dehnert (Zbl.Bakt.I Orig. 169:66 (1957) recommended a 20% woman's milk agar. A liquid culture medium of 20 substances is given by Tomarelli, Norris, Gyorgy, Hassinsen and Bernhart (J.Biol.Chem 181: 879 (1940)). Petuely and Lynau (Bioch.Zschr. 326: 62 (1954)) utilized a completely synthetic nutrient medium with 11 various substances.

The hitherto known nutrient mediums (both solid and liquid) are not suited for the industrial production of *Lactobacillus bifidus* in large amounts, as is necessary for therapeutic utilization of the organism, since these nutrient mediums are either too costly and too complicated to produce, or they only permit very slight growth of the *Lactobacillus bifidus*.

It is accordingly a primary object of the present invention to provide a simple method suitable for the large scale production of *Lactobacillus bifidus*.

It is another object of the present invention to provide a method for the large scale production of *Lactobacillus bifidus* utilizing normal nutrient mediums.

It is yet another object of the present invention to provide a method for the production of *Lactobacillus bifidus* which does not require anerobic conditions.

It is another object of the present invention to provide a method of culturing *Lactobacillus bifidus* wherein conditions which can normally be used for the culturing of other bacteria can be utilized for the culturing of the *Lactobacillus bifidus*.

Other objects and advantages of the present invention will be apparent from a further reading of the specification and of the appended claims.

With the above objects in view the present mainly comprises the production of *Lactobacillus bifidus* by culturing the *Lactobacillus bifidus* together with at least *Escherichia coli*.

It has been discovered in accordance with the present invention that if *Lactobacillus bifidus* is cultured together with *Escherichia coli* then it is possible to culture the *Lactobacillus bifidus* utilizing ordinary solid or liquid nutrient mediums of the simplest composition and even carrying out the culturing without the need for anerobic conditions.

Thus, in accordance with the present invention mixed colonies of *Lactobacillus bifidus* and *Escherichia coli*, obtained either from a natural source such as a stool smear or from an artificial source such as by mixing artificial pure cultures of each of the bacteria, are cultured together. In the case of mixed colonies from feces smears it is to be noted that microscopic pictures show that the gram-negative colibacteria and the gram-positive bifidus bacteria are found together in mixtures.

In accordance with the present invention mixed colonies obtained from whatever source are incubated on a solid or liquid nutrient medium of the simplest possible type (for the sake of economy and since the mixed colonies can be cultured on any nutrient medium) and within a short time (18 to 24 hours) a very strong growth of *Lactobacillus bifidus* occurs. Excellent results have been obtained with the simplest conceivable nutrient mediums such as water with a slight addition of flour or bran with a trace of chalk.

It has been found in accordance with the present invention that as long as *Escherichia coli* is present together with the *Lactobacillus bifidus* the culturing can be carried out as mentioned above with the simplest possible nutrient mediums and under the simplest possible conditions. If the *Escherichia coli* is present along with the *Lactobacillus bifidus* it is also possible to have another bacteria present such as *Bacterium acidophilum*. However the *Escherichia coli* must under all circumstances be present along with the *Lactobacillus bifidus* in order to achieve the advantages of the present invention.

As long as there is some *Escherichia coli* present along with the *Lactobacillus bifidus* the culturing can proceed as set forth above. Thus, the basis of the present invention is the discovery that if *Lactobacillus bifidus* is cultured together with *Escherichia coli* it is possible to utilize normal, simple culture mediums in order to achieve a high degree of growth of the *Lactobacillus bifidus*.

This means, that normal temperature and atmospheric conditions which can be used for the culturing of bacteria which could always be cultured without difficulty, such as temperatures of 28 to 45° C., preferably 37° C., normal atmospheric conditions of pressure and composition of the atmosphere, and culturing times of 12 to 72 hours, preferably 24 hours, can be utilized to achieve high yield of *Lactobacillus bifidus*.

Furthermore, the culture mediums utilized are of the simplest possible type, for reasons of economy, although of course more complicated and expensive culture mediums can also be used. Thus, for example, as solid culture mediums there may be mentioned the usual agar plates, or the usual agar plates with additions of sugar, liver, blood or mash. As examples of the simple liquid culture mediums there may be mentioned the usual boullion with 1% of sugar, mash-boullion, water with flour or bran additions.

Thus, nutrient mediums may simply be produced in the normal manner by taking for example water with 1% of flour or bran and with the addition of 0.1% of chalk and sterilizing the same in an autoclave for one-half hour at a temperature of 134° C. After cooling, this nutrient medium is inoculated with the bacteria and incubated, most preferably at 37° C. The inoculation may proceed by either separately introducing *Lactobacillus bifidus* and *Escherichia coli* each separately obtained from anerobic dextrose-blood-ager plates, with the mixing of the bacteria to be incubated first taking place in the above-mentioned culture medium, or already existing mixed colonies of the two bacteria obtained as mentioned above, in a natural source such as a feces smear are inoculated into the nutrient medium, either solid or a liquid.

Tests have shown that *Lactobacillus bifidus* and *Escherichia coli* in mixtures in reagent tubes containing the simplest liquid nutrient mediums (water with 1% of bran or flour and 0.1% of chalk) have lived for more than four weeks without transplantation and without a carbon dioxide atmosphere. This provides for a particular advantage in permitting the culture storage of the *Lactobacillus bifidus* and *Escherichia coli*.

Although it is possible to utilize expensive nutrient mediums as well as the simple ones mentioned above, the basis of the present invention is the possibility of culturing *Lactobacillus bifidus* without the need for the costly and very time consuming to produce and troublesome nutrient mediums since it has been discovered that the *Escherichia coli* bacteria in some manner act to permit the growth of the *Lactobacillus bifidus*.

Another important advantage of the present invention is that when a liquid nutrient medium is utilized neither nitrogen nor carbon dioxide need be passed therethrough. It is quite surprising that the *Lactobacillus bifidus* when in mixture with the *Escherichia coli* alone or together with another bacteria such as *Bacterium acidophilum*, grows without any severe anerobic conditions and without introduction of carbon dioxide in view of the fact, as already mentioned above that the literature has shown that an aerobic growth of *Lactobacillus bifidus* is not possible. Thus, the new culturing method of the present invention permits the producing of the *Lactobacillus bifidus* in large commercial quantities for therapeutic purposes while greatly reducing the cost of producing the *Lactobacillus bifidus*.

Tests carried out on an anerobic dextrose blood plate with china blue (3 grams of dextrose, 4 grams of peptone solution 50%, 3 cc. of china blue, 7 cc. of rams blood per 100 cc. of nutrient agar) have shown that *Lactobacillus bifidus* alone will not grow while when mixed with *Escherichia coli* the mixture will grow resulting in the production of both *Lactobacillus bifidus* and *Escherichia coli*. *Escherichia coli* when cultured without *Lactobacillus bifidus* will grow.

The following examples are given to further illustrate the present invention. The scope of the invention is not, however, meant to be limited to the specific details of the examples.

Example 1

A colony of *Escherichia coli* is smeared onto a 1% dextrose-agar-plate. A colony of *Lactobacillus bifidus* is inoculated onto this smear in the same manner. After 48 hours of anerobic incubation at 37° C., the *Lactobacillus bifidus* has grown together with the *Escherichia coli*. *Lactobacillus bifidus* alone does not grow in this nutrient medium.

Example 2

A colony of *Escherichia coli* and a colony of *Lactobacillus bifidus* is inoculated into a flask of water containing 1% of flour (after sterilization). After 24 hours of aerobic incubation at 37° C., the *Lactobacillus bifidus* together with the *Escherichia coli* has multiplied. An inoculation of *Lactobacillus bifidus* alone in this nutrient medium does not result in any growth at all. The same example may be carried out utilizing a mixed colony consisting of both *Escherichia coli* and *Lactobacillus bifidus* with the same results.

Example 3

A flask of water containing 1% bran and 1% dextrose is inoculated with one or several colonies each of *Bacterium acidophilus*, *Lactobacillus bifidus* and *Escherichia coli*. After 24 to 28 hours of aerobic incubation at 37° C. it is found that all three types of bacteria have grown.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The method of producing *Lactobacillus bifidus* which comprises culturing *Lactobacillus bifidus* together with a *Escherichia coli*.

2. The method of producing *Lactobacillus bifidus* which comprises culturing *Lactobacillus bifidus* together with a *Escherichia coli* under aerobic conditions at a temperature of between about 28° C. and 45° C. and for a period of between about 12 and 72 hours.

3. The method of producing *Lactobacillus bifidus* which comprises culturing *Lactobacillus bifidus* together with a *Escherichia coli* under anerobic conditions.

4. The method of producing *Lactobacillus bifidus* which comprises culturing *Lactobacillus bifidus* together with a *Escherichia coli* in a solid culture medium in which a culture of *Escherichia coli* will grow also in the absence of *Lactobacillus bifidus* but which is substantially incapable of supporting growth of a pure culture of *Lactobacillus bifidus*.

5. The method of producing *Lactobacillus bifidus* which comprises culturing *Lactobacillus bifidus* together with a *Escherichia coli* in a liquid culture medium in which a culture of *Escherichia coli* will grow also in the absence of *Lactobacillus bifidus* but which is substantially incapable of supporting growth of a pure culture of *Lactobacillus bifidus*.

6. The method of producing *Lactobacillus bifidus* which comprises culturing *Lactobacillus bifidus* together with a *Escherichia coli* and with *Bacterium acidophilus*.

7. The method of producing *Lactobacillus bifidus* which comprises culturing *Lactobacillus bifidus* together with a *Escherichia coli* in a culture medium of water containing chalk and at least one substance selected from the group consisting of flour, bran and mash.

8. The method of producing *Lactobacillus bifidus* which comprises culturing *Lactobacillus bifidus* together with a *Escherichia coli* under aerobic conditions at a temperature of between about 28° C. and 45° C. and for a period of between about 12 and 72 hours in a nutrient medium of water containing chalk and at least one substance selected from the group consisting of flour, bran and mash.

References Cited in the file of this patent

UNITED STATES PATENTS

| | | |
|---|---|---|
| 1,899,817 | Matt | Feb. 28, 1933 |
| 2,694,640 | Gyorgy et al. | Nov. 16, 1954 |
| 2,710,806 | Gyorgy et al. | June 14, 1955 |

OTHER REFERENCES

Rose et al.: Proc. of Society of Exptl. Biol. and Medicine, vol. 81, pp. 712 to 715 (December 1952).